Patented Oct. 11, 1938

2,132,397

UNITED STATES PATENT OFFICE 2,132,397

BAKED GOODS AND PROCESS OF MAKING SAME

Herbert S. Coith, Albert S. Richardson, and Verling M. Votaw, Wyoming, Ohio, assignors to The Procter & Gamble Company, Cincinnati, Ohio, a corporation of Ohio No Drawing. Application May 17, 1934, Serial No. 726,174

45 Claims. (Cl. 99—92)

Our invention relates to cakes and the process of making same.

The main object of our invention is to produce cakes of improved appearance and eating qualities, particularly with respect to a uniformly light and tender texture in combination with high sugar content. Moistness, sweetness, and tenderness are highly prized in cakes, and are obtained in increasing degree as the ratio of sugar to flour is increased and moisture is added. However, as these changes are made, the finished baked cake tends to become smaller in volume and heavier in texture, until a point is reached where the cake falls at the end of baking to the extent of being classed as sad, sometimes even a complete failure. In practice, this tendency to shrink or fall limits the amount of sugar which may be successfully incorporated in cakes, particularly those containing shortening. In shortened cakes manufactured in commercial bakeries prior to the present invention, it was common practice to limit the amount of sugar to less than the amount of flour, notwithstanding the fact that more sugar and along with it increased moisture would have been desirable from the standpoint of the sweetness, moistness, and good keeping quality. It is the object of our invention to overcome, or in large measure to counteract, this tendency of cakes to fall as the ratio of sugar to flour is increased, and to make practical the production of shortened cakes with a proportion of sugar at least equal to and preferably larger than the proportion of flour, also with a high content of milk or other aqueous ingredients, without sacrifice of the light texture which is essential to high quality. Practice of our invention is particularly advantageous in the making of cakes in commercial bakeries; for reasons not fully understood the large scale mechanical mixing methods of commercial cake making tend on the average to develop the faults heretofore associated with high sugar content even more than the household methods of mixing cake batter on smaller scale.

We have already disclosed in our copending application, Serial No. 655,295, filed February 4, 1933, of which the present application is a continuation in part, that the objects set forth above may be obtained by incorporating in the cake batter a suitable quantity of fat containing combined glycerin in excess of that occuring in natural fats and commercial shortenings previously available. We have discovered that monoglyceride is in general more efficient than diglyceride for increasing the sugar carrying capacity of cakes, and that monoglyceride is essential for best results if the synthetic fat is derived from the high-melting saturated fatty acids such as palmitic and stearic. The present invention is the result of extensive experiments to determine how the shrinkage of freshly baked cakes of high sugar content is affected by the various fatty esters containing unesterified hydroxyl groups, not only those derived from glycerin but also those derived from other polyhydric alcohols.

We have found that the most effective of the hydroxy fatty esters for purposes of decreasing shrinkage of cakes are those which contain two or more unesterified hydroxyl groups per molecule. While we do not represent all hydroxy fatty esters containing only one unesterified hydroxyl group to be without any stabilizing action on the volume of cakes made with high sugar content, we have found a number of them to be ineffective and have found none of them to compare favorably in efficiency with an equal weight of the corresponding ester containing two unesterified hydroxyl groups per molecule.

More specifically the broad class of effective reagents which we have found to inhibit the shrinkage of high sugar cakes may be described as esters having a molecular formula containing at least two unesterified hydroxyl groups and consisting of polyhydric alcohol incompletely esterified with fatty acid. At least one of the unesterified hydroxyl groups in such a molecular complex resides in the polyhydric alcohol radical. Our investigations lead us to the conclusion that these structural elements in a fatty ester are sufficient to ensure a high degree of efficiency in the prevention of cake shrinkage of the type herein described, although, of course, all such compounds are not equally efficient.

The main body of hydroxy fatty esters suitable for use in the practice of our invention consists of the monoglycerides and the corresponding fatty esters of those polyhydric alcohols which have a molecular formula containing more than three carbon atoms. No specific claim to the incorporation of monoglycerides in cakes is made in the present application, this being part of the subject matter of our copending application, Serial No. 655,295.

In the case of fatty esters of polyhydric alcohols of more than three carbon atoms, the alcohol radical may be of simple type, e. g., sorbitol or mannitol, or it may be complex in type, e. g. xylose, fructose, or citric acid. The carbon atoms of the polyhydric alcohol radical may be linked directly together, as in the above examples, or indirectly as in the ether linkage of sucrose or diglycerol.

The fatty acid radicals of the requisite esters are those of the characteristic higher fatty acids which may be derived from any of the commercially known edible fats and oils, but on account of flavor we prefer to use esters of fatty acids of molecular formula containing predominantly sixteen or more carbon atoms. However, the corresponding esters of the $C_6$ to $C_{14}$ fatty acids, such as occur in coconut oil, are also effective in preventing cake shrinkage and may be used in such proportions as are found by empirical test not to be objectionable in flavor.

The following hydroxy fatty esters, for example, are thus suitable for incorporation in cakes made in accordance with our invention:

Monoglyceride of the fatty acids of hydrogenated cottonseed oil of 70 iodine value.

The esterification product of equimolar proportions of diglycerol and the fatty acids from hydrogenated cottonseed oil of 70 iodine value.

Sucrose monostearate.
Fructose monostearate.
Monostearate of triglycerol.
Mannitol monostearate.
Monoglyceride of ricinoleic acid.
Diglyceride of ricinoleic acid.
Stearate of tartaric acid,
$CO(OH)$—$CH(OH)$—$CH(O$—$CO$—$C_{17}H_{35})$—$CO$—$OH$ The method of preparing the hydroxy fatty esters does not as such constitute a part of the present invention. The esters of glycerol and the polyglycerols are readily prepared by direct esterification, a well-known procedure. Most of the other polyhydric alcohols, particularly the sugars, are best esterified by use of the fatty acid chlorides, according to procedures recorded in the literature. The reaction product is in general a mixture of isomers, so that in most of the above examples the essential structure has been described without reference to a specific structure formula.

The diglyceride of ricinoleic acid is an example of one of our reagents having a molecular complex in which only one of the unesterified hydroxyl groups resides in the polyhydric alcohol radical itself. A special case of such a compound is one with a formula containing a hydroxyl group as a part of a carboxyl group, such as result from esterifying tartaric acid, citric acid, and the like with chlorides of the fatty acids.

We have found that the triglycerides of hydroxy acids, both saturated and unsaturated, are not generally effective for preventing cake shrinkage, even though such esters contain two or three unesterified hydroxyl groups per molecule. The mono fatty acid esters of glycols and polyglycols are not effective. These ineffective esters, of course, do not come within the scope of any claim to the present invention. Diglycerides are claimed in the present application only to the extent that their efficiency may be augmented by the presence of unesterified hydroxyl groups outside the glyceryl radical.

A number of hydroxy fatty esters not found effective for inhibiting cake shrinkage are quite effective as emulsifying agents, so that there is no close connection between these two properties.

The quantity of hydroxy fatty ester in the cake may be arbitrarily varied within wide limits. The reagents as made by known methods differ somewhat in their effectiveness. We prefer in practical operation to use at least about 2% of the special ester based on the total shortening, and at least about .2% based on the total cake batter, but a demonstrable improvement in final cake volume usually results from the use of even smaller amounts. If more than one hydroxy ester is used in the cake the effect is substantially additive and the quantity of each reagent may be reduced accordingly.

The hydroxy fatty ester employed in practice of this invention may be added directly to the cake batter at any stage of the mixing, or may be premixed with any of the other cake ingredients. We prefer to premix it with the shortening in dry form, this being the subject matter of our application, Serial No. 726,175, filed concurrently herewith.

Our invention is particularly valuable for production of cakes containing a chemical leavening agent, like the so-called layer cakes, but also of distinct value for retarding shrinkage of other cakes, e. g., the so-called pound cakes, depending mainly on incorporation of air for a leavening effect.

We find it advantageous to incorporate in our cakes, in addition to the small quantity of hydroxy fatty ester, a still smaller quantity of free fatty acid and/or soap. The stabilizing effect of such a combination of ingredients is rather more than the additive effect of the ingredients separately, but the free fatty acid or soap is not essential to successful practice of the invention and no claim is made to the incorporation of either of these ingredients except as an accessory reagent in combination with the special ester.

The following examples are illustrative only, and anyone skilled in the art of baking will be able readily to apply the teachings of the present specification in innumerable combinations other than those specifically suggested.

*Example 1.—White layer cake*

| | Lbs. | Ozs. |
|---|---|---|
| Sugar | 1 | 7 |
| Salt | | ½ |
| Shortening | | 7 |
| Monoglyceride of fatty acids from lard | | ⅓ |
| Milk | 1 | |
| Vanilla | | ¼ |
| Cake flour | 1 | |
| Baking powder | | ¾ |
| Egg whites | | 10 |

All of the ingredients except the egg whites are put in the bowl of a mixing machine, e. g., a Hobart mixer, and mixed for 10 minutes at low speed. The egg whites are added and the mixing continued at low speed for 10 minutes. Baking is carried out at 375° F. in layer cake pans.

*Example 2.—Devil's food cake*

| | Lbs. | Ozs. |
|---|---|---|
| Flour | 1 | 0 |
| Shortening | | 8½ |
| Monoglycerides of the fatty acids of hydrogenated cottonseed oil of 65 iodine value | | ½ |
| Sugar | 1 | 6½ |
| Cocoa | | 3¼ |
| Salt | | ⅝ |
| Soda | | ¼ |
| Baking powder | | ⅝ |
| Milk | 1 | 4¾ |
| Egg whites | | 12 |
| Vanilla | | ¼ |

The first three ingredients are mixed together at low speed in a Hobart or similar mixing machine. At the end of three minutes, the sugar, cocoa, salt, soda, baking powder, and half of the milk are added and mixing continued at low speed for another three minutes. Finally, the eggs, vanilla, and the remainder of the milk are added and a final mixing period of three minutes at low speed is given. Baking is carried out at 375° F.

*Example 3.—Yellow cake*

| | Lbs. | Ozs. |
|---|---|---|
| Flour | 1 | 0 |
| Superglycerinated fat (see below) | | 7½ |
| Sugar | 1 | 2½ |
| Salt | | ½ |
| Baking powder | | 1 |
| Milk | 1 | 2½ |
| Whole eggs | | 12¼ |
| Vanilla | | ¼ |

A suitable superglycerinated fat for use in the above formula is obtained by reacting hydrogenated cottonseed oil of about 70 iodine value with glycerin, thereby producing a synthetic fat containing about 20% combined glycerin which comprises a considerable proportion of monoglyceride. The mixing and baking are carried out as in Example 2.

*Example 4.—Yellow layer cake*

| | Lbs. | Ozs. |
|---|---|---|
| Flour | 1 | 0 |
| Shortening as described below | | 8¾ |
| Sugar | 1 | 6½ |
| Salt | | ⅝ |
| Baking powder | | 1 |
| Milk | 1 | ⅞ |
| Whole eggs | | 9⅝ |
| Vanilla | | ¼ |

The shortening used in this formula is a plastic blend consisting of 98% partially hydrogenated cottonseed oil (or other plastic triglyceride mixture) and 2% of the fatty ester obtained by esterifying equimolecular quantities of diglycerol and fatty acids derived from hydrogenated vegetable oil of 70 iodine value. Mixing and baking are carried out as in Example 2.

*Example 5.—White layer cake*

| | Lbs. | Ozs. |
|---|---|---|
| Flour | 1 | 0 |
| Shortening as described below | | 8 |
| Sugar | 1 | 7¼ |
| Salt | | ½ |
| Baking powder | | ¾ |
| Milk | 1 | 0 |
| Egg whites | | 10 |
| Vanilla | | ¼ |

The shortening used in this example is composed of 2% sucrose monostearate and 98% plastic triglyceride shortening of the usual type. The mixing and baking are carried out in the same way as in Example 2.

*Example 6.—White layer cake*

The same ingredients are used and the same procedure followed as in Example 5, except that sucrose monostearate is replaced with a synthetic ester formed by combination of mannitol and the fatty acids derived from cottonseed oil hydrogenated to about 70 iodine value.

*Example 7.—White layer cake*

| | Lbs. | Ozs. |
|---|---|---|
| Sugar | 1 | 7 |
| Salt | | ½ |
| Shortening as described below | | 7½ |
| Milk | 1 | 0 |
| Vanilla | | ¼ |
| Cake flour | 1 | 0 |
| Baking powder | | ¾ |
| Egg whites | | 10 |

The shortening used in this formula is a plastic blend consisting of 98% partially hydrogenated cottonseed oil (or other plastic triglyceride mixture) and 2% of the stearate of tartaric acid. Mixing and baking are carried out as in Example 1.

*Example 8.—Yellow layer cake*

| | Lbs. | Ozs. |
|---|---|---|
| Flour | 1 | 0 |
| Shortening as described below | | 8¾ |
| Sugar | 1 | 6½ |
| Salt | | ⅝ |
| Baking powder | | 1 |
| Milk | 1 | ⅞ |
| Whole eggs | | 9⅝ |
| Vanilla | | ¼ |

The shortening used in this formula is a plastic blend consisting of 97% partially hydrogenated cottonseed oil (or other plastic triglyceride mixture) and 3% of the monoglyceride of ricinoleic acid. Mixing and baking are carried out as in Example 2.

The volume of each of the above cakes after baking and cooling will ordinarily be between 10% and 25% greater than that of the corresponding cake in which the hydroxy fatty ester is replaced with triglyceride of the same fatty acids, except in the case of Example 3. The volume of this cake is in the neighborhood of 30% greater than the volume of the baked product made with ordinary triglyceride fat in the place of superglycerinated fat, which product is so heavy and soggy that it can scarcely be classified as a cake at all.

It will be understood that, where the hydroxy fatty esters in the above examples are specified in terms of their chemical formula, e. g., monoolein or sucrose stearate, it is not necessary that chemically pure materials be used, since satisfactory results are obtained without any elaborate purification of the reaction product of the known methods for making these materials.

It will also be appreciated that the recital in the claims appended hereto of the term "an ester" is intended to cover a mixture of esters falling within the stated definition; for instance, several esters of different polyhydroxy alcohols and/or different fatty acids are obviously contemplated unless restrictive language is used.

Having thus described the invention, what is claimed as new and desired to be secured by Letters Patent is:

1. In the process of making cakes containing flour and more sugar than flour, the step which consists in incorporating in the mix, in quantity sufficient to effect substantial decrease in the amount of shrinkage of the cake at the end of baking, a shortening agent comprising an ester having a molecular formula containing at least two unesterified hydroxyl groups and consisting of polyhydric alcohol incompletely esterified with higher fatty acid.

2. In the process of making cakes containing flour and more sugar than flour, the step which consists in adding as a constituent of the mix a shortening agent comprising at least 2% synthetic derivative of polyhydric alcohol and higher fatty acid combined in such proportion as to yield essentially esters of molecular formula containing two or more unesterified hydroxyl groups, at least one of which resides in the polyhydric alcohol radical.

3. The process claimed in claim 1, in which the added ester is derived from a polyhydric alcohol of molecular formula containing more than three carbon atoms.

4. The process claimed in claim 1, in which the added ester is a polyglycerol incompletely esterified with fatty acid.

5. The process claimed in claim 1, in which the polyhydric alcohol from which the added ester is derived comprises a sugar.

6. The process claimed in claim 1, in which the quantity of hydroxy fatty ester incorporated in the cake is not less than about .2% of the total weight of the mix.

7. The process of making cake which comprises mixing flour, shortening, leavening agent, egg, milk, and sugar in amount exceeding the amount of flour, and incorporating in the mix an ester having a molecular formula containing at least two unesterified hydroxyl groups and consisting of polyhydric alcohol incompletely esterified with higher fatty acid, the quantity of said ester being sufficient to effect a substantial decrease in the shrinkage of the cake at the end of baking.

8. The process claimed in claim 7, in which the quantity of hydroxy fatty ester is not less than .2% of the total weight of the cake batter.

9. The process claimed in claim 7, in which the hydroxy fatty ester incorporated in the cake batter is derived from a polyhydric alcohol containing more than three carbon atoms.

10. Sweet baked goods containing flour and more sugar than flour and containing, in sufficient quantity to effect substantial decrease in the amount of shrinkage of the product at the end of baking, fat comprising an ester having a molecular formula containing at least two unesterified hydroxyl groups and consisting of polyhydric alcohol incompletely esterified with higher fatty acid.

11. The product claimed in claim 10, in which the quantity of hydroxy fatty ester contained in the cake is not less than about .2% of the weight of the cake.

12. The product claimed in claim 10, in which the ester is derived from a polyhydric alcohol of molecular formula containing more than three carbon atoms.

13. Sweet baked goods containing flour and more sugar than flour and containing a shortening agent comprising at least 2% synthetic derivative of polyhydric alcohol and higher fatty acid combined in such proportion as to yield essentially esters of molecular formula containing two or more unesterified hydroxyl groups, at least one of which resides in the polyhydric alcohol radical.

14. A cake containing flour, more sugar than flour, a chemical leavening agent and plastic shortening comprising a hydroxy fatty ester having a molecular formula containing at least two unesterified hydroxyl groups and consisting of polyhydric alcohol incompletely esterified with higher fatty acid in amount sufficient to effect substantial reduction of the amount of shrinkage of the cake at the end of baking.

15. The process claimed in claim 1, in which the polyhydric alcohol from which the added ester is derived comprises sucrose.

16. In the process of making cakes containing flour and more sugar than flour, the step which consists in incorporating a shortening agent comprising sucrose monostearate in the mix, the quantity of sucrose monostearate being sufficient to effect substantial decrease in the amount of shrinkage of the cake at the end of baking.

17. The process claimed in claim 1, in which the polyhydric alcohol from which the added ester is derived comprises mannitol.

18. In the process of making baked goods containing sugar and flour, the ratio of sugar to flour being sufficiently high to cause material shrinkage at the end of baking of goods containing no shrinkage reducing agent, the step which consists in incorporating in the mix a shortening agent comprising an ester having a molecular formula containing at least two unesterified hydroxyl groups, and consisting of polyhydric alcohol incompletely esterified with higher fatty acid, the quantity of the ester introduced being sufficient to secure increased volume of a minimum of about 10% over similar goods baked without a shrinkage reducing agent.

19. The process claimed in claim 18, in which the added ester is derived from a polyhydric alcohol of molecular formula containing more than three carbon atoms.

20. Sweet baked goods containing sugar and flour, the ratio of sugar to flour being sufficiently high to cause material shrinkage at the end of baking in the absence of a shrinkage reducing agent, and containing a shortening agent comprising an ester having a molecular formula containing at least two unesterified hydroxyl groups and consisting of polyhydric alcohol of more than three carbon atoms incompletely esterified with higher fatty acid, the quantity of such ester being sufficient to secure a minimum of about 10% increase in volume over similar goods baked without a shrinkage reducing agent.

21. The method of effecting a reduction in the amount of shrinkage of cakes having such a high ratio of sugar to flour as to cause substantial shrinkage in volume at the end of baking, which consists in adding to the cake mix before baking a shortening agent comprising an ester having a molecular formula containing at least two unesterified hydroxyl groups and consisting of polyhydric alcohol incompletely esterified with higher fatty acid in sufficient quantity to produce a cake having an increased volume of at least 10% over cakes made without a shrinkage reducing agent.

22. In the process of making cakes containing flour and sugar, the step which consists in incorporating in the mix, a shortening agent, said agent comprising in quantity sufficient to effect substantial decrease in the amount of shrinkage of the cake at the end of baking, an ester having a molecular formula containing at least two unesterified hydroxyl groups and consisting of polyhydric alcohol having more than three carbon atoms incompletely esterified with higher fatty acid.

23. In the process of making cakes containing flour and more sugar than flour, the step which consists in incorporating in the mix a shortening agent, said agent comprising in quantity sufficient to effect substantial decrease in the amount of shrinkage of the cake at the end of baking, an ester having a molecular formula containing at least two unesterified hydroxyl groups and consisting of polyhydric alcohol incompletely esterified with higher fatty acid, and a smaller quantity of soap.

24. In the process of making cakes containing flour and more sugar than flour, the step which consists in incorporating in the mix a shortening agent, said agent comprising in quantity sufficient to effect substantial decrease in the amount of shrinkage of the cake at the end of baking, an ester having a molecular formula containing at least two unesterified hydroxyl groups and consisting of polyhydric alcohol incompletely esterified with higher fatty acid, and a smaller quantity of free fatty acid.

25. In the process of making cakes containing flour and more sugar than flour, the step which consists in incorporating in the mix, in quantity sufficient to effect substantial decrease in the amount of shrinkage of the cake at the end of baking, a shortening agent consisting of an ester having a molecular formula containing at least two unesterified hydroxyl groups and consisting of polyhydric alcohol incompletely esterified with higher fatty acid.

26. In the process of making cakes containing flour and more sugar than flour, the step which consists in incorporating in the mix, in quantity sufficient to effect substantial decrease in the amount of shrinkage of the cake at the end of baking, a shortening consisting of synthetic fat containing about 20% combined glycerin.

27. In the art of making sweet baked goods of light, moist consistency, which with triglyceride shortening would be dense, the employment of a shortening comprising a higher fatty acid ester of molecular formula having at least two unesterified hydroxyl groups and consisting essentially of a polyhydroxy substance, the latter having more than three carbon atoms, incompletely esterified with higher fatty acids.

28. A cake formed from a batter containing flour and more sugar than flour and containing, in sufficient quantity to effect substantial decrease in the amount of shrinkage of the product at the end of baking, fat comprising an ester having a molecular formula containing at least two unesterified hydroxyl groups and consisting of a polyhydric alcohol incompletely esterified with higher fatty acid.

29. In the process of making cakes, the batter of which contains flour and more sugar than flour, the step which consists in incorporating in the mix, in quantity sufficient to effect substantial decrease in the amount of shrinkage of the cake at the end of baking, a higher fatty acid polyglyceride having at least two unesterified hydroxyl groups.

30. A cake formed from a batter containing flour and more sugar than flour, and containing, in quantity sufficient to effect substantial decrease in the amount of shrinkage of the cake at the end of baking, a higher fatty acid polyglyceride having at least two unesterified hydroxyl groups.

31. In the process of making cakes, the batter of which contains flour and sugar, the step which consists in incorporating in the mix, a shortening agent, said agent comprising in quantity sufficient to effect substantial decrease in the amount of shrinkage of the cake at the end of baking, an ester having a molecular formula containing at least two unesterified hydroxyl groups and consisting of polyhydric alcohol having more than three carbon atoms incompletely esterified with higher fatty acid.

32. A cake formed from a batter comprising flour and much more sugar than flour, a leavening agent, and comprising shortening of which up to about 2% of the usual triglyceride fat is replaced with an ester having a molecular formula containing at least two unesterified hydroxyl groups and consisting of a polyhydric alcohol incompletely esterified with higher fatty acid, the amount of said ester being sufficient to decrease materially the shrinkage of the cake at the end of baking.

33. A cake formed from a batter containing flour, about 40% more sugar than flour, more moisture than flour, and suitable quantities of egg, and containing shortening which consists of a major proportion of triglyceride fat together with about 2% of higher fatty acid polyglyceride having at least two unesterified hydroxyl groups, said polyglyceride functioning to effect a substantial decrease in the shrinkage of the cake at the end of baking.

34. In the process of making cakes, the batter of which contains flour and much more sugar than flour, and a leavening agent, the step which consists in incorporating in the mix shortening of which up to about 2% of the usual triglyceride fat is replaced with an ester having a molecular formula containing at least two unesterified hydroxyl groups and consisting of polyhydric alcohol incompletely esterified with higher fatty acid, said polyhydric alcohol being selected from the group consisting of sorbitol and mannitol, the amount of said ester being sufficient to decrease materially the shrinkage of the cake at the end of baking.

35. In the process of making cakes, the batter of which contains unusually large proportions of both sugar and moisture relative to the quantity of flour, the step which consists in incorporating in the mix shortening containing about 2% of higher fatty acid polyglyceride having at least two unesterified hydroxyl groups, said polyglyceride functioning to effect a substantial decrease in the shrinkage of the cake at the end of baking.

36. The method of effecting a reduction in the amount of shrinkage of cakes having such a high ratio of sugar to flour as to cause substantial shrinkage in volume at the end of baking, which consists in adding to the cake mix before baking a shortening agent comprising an ester having a molecular formula containing at least two unesterified hydroxyl groups and consisting of a polyglycerol incompletely esterified with higher fatty acid in sufficient quantity to produce a cake having an increased volume of at least 10% over cakes made without a shrinkage reducing agent.

37. The method of effecting a reduction in the amount of shrinkage of cakes having such a high ratio of sugar to flour as to cause substantial shrinkage in volume at the end of baking, which consists in adding to the cake mix before baking a shortening agent comprising an ester having a molecular formula containing at least two unesterified hydroxyl groups and consisting of a sugar incompletely esterified with higher fatty acid in sufficient quantity to produce a cake having an increased volume of at least 10% over cakes made without a shrinkage reducing agent.

38. In the process of making cakes containing flour and sugar, the step which consists in incorporating in the mix a shortening agent, said agent comprising in quantity sufficient to effect substantial decrease in the amount of shrinkage of the cake at the end of baking, an ester having a molecular formula containing at least two unesterified hydroxyl groups and consisting of a polyglycerol incompletely esterified with higher fatty acid.

39. In the process of making cakes containing flour and sugar, the step which consists in incorporating in the mix a shortening agent, said agent comprising in quantity sufficient to effect substantial decrease in the amount of shrinkage of the cake at the end of baking, an ester having a molecular formula containing at least two unesterified hydroxyl groups and consisting of a sugar incompletely esterified with higher fatty acid.

40. In the art of making sweet baked goods of light, moist consistency, which with triglyceride shortening would be dense, the employment of a shortening comprising a higher fatty acid ester of molecular formula having at least two unesterified hydroxyl groups, said ester consisting essentially of a polyglycerol incompletely esterified with higher fatty acid.

41. A white cake containing flour, more sugar than flour, egg white, a chemical leavening agent, and plastic shortening comprising a hydroxy fatty ester having a molecular formula containing at least two unesterified hydroxyl groups and consisting of polyhydroxy substance incompletely esterified with higher fatty acid in amount sufficient to effect substantial reduction of the amount of shrinkage of the cake at the end of baking.

42. A white cake containing flour, more sugar than flour, egg white, a chemical leavening agent, and plastic shortening comprising a hydroxy fatty ester having a molecular formula containing at least two unesterified hydroxyl groups and consisting of a polyhydroxy substance having more than three carbon atoms incompletely esterified with higher fatty acid in amount sufficient to effect substantial reduction of the amount of shrinkage of the cake at the end of baking.

43. Sweet baked goods consisting of white cake containing shortening, a leavening agent, egg material consisting of egg white, sugar and flour, the ratio of sugar to flour being sufficiently high to cause material shrinkage at the end of baking in the absence of a shrinkage reducing agent, and containing a shortening agent comprising an ester having a molecular formula containing at least two unesterified hydroxyl groups and consisting of a polyhydroxy substance of more than three carbon atoms incompletely esterified with higher fatty acid, the quantity of such ester being sufficient to secure a minimum of about 10% increase in volume over similar goods baked without a shrinkage reducing agent.

44. Sweet baked goods consisting of white cake containing shortening, a leavening agent, egg material consisting of egg white, sugar and flour, the ratio of sugar to flour being sufficiently high to cause material shrinkage at the end of baking in the absence of a shrinkage reducing agent, and containing a shortening agent comprising an ester having a molecular formula containing at least two unesterified hydroxyl groups and consisting of polyglycerol of more than three carbon atoms incompletely esterified with higher fatty acid, the quantity of such ester being sufficient to secure a minimum of about 10% increase in volume over similar goods baked without a shrinkage reducing agent.

45. In the process of making cakes, the batter of which contains flour and much more sugar than flour, and a leavening agent, the step which consists in incorporating in the mix shortening of which up to about 2% of the usual triglyceride fat is replaced with an ester having a molecular formula containing at least two unesterified hydroxyl groups and consisting of polyhydric alcohol incompletely esterified with higher fatty acid, the amount of said ester being sufficient to decrease materially the shrinkage of the cake at the end of baking.

HERBERT S. COITH.
ALBERT S. RICHARDSON.
VERLING M. VOTAW.